United States Patent [19]

Suggitt et al.

[11] 3,760,018
[45] Sept. 18, 1973

[54] HYDROALKYLATION CATALYST AND PROCESS

[75] Inventors: Robert M. Suggitt; Alfred Arkell; John M. Crone, Jr., all of Wappingers Falls, N.Y.

[73] Assignee: Texaco, Inc., New York, N.Y.

[22] Filed: May 17, 1971

[21] Appl. No.: 144,213

[52] U.S. Cl. .......... 260/668 F, 260/667, 260/668 R
[51] Int. Cl. ............................................. C07c 15/20
[58] Field of Search ............. 260/667, 668 R, 668 F

[56] References Cited
UNITED STATES PATENTS

| | | | |
|---|---|---|---|
| 3,529,029 | 9/1970 | Pollitzer | 260/667 |
| 3,598,723 | 8/1971 | Rausch | 260/667 |
| 3,600,301 | 8/1971 | Rausch | 260/667 |

Primary Examiner—Curtis R. Davis
Attorney—Thomas H. Whaley, Carl G. Ries and H. L. Madinger

[57] ABSTRACT

A method for the catalytic hydroalkylation of an aromatic hydrocarbon. An aromatic hydrocarbon, for example, benzene is contacted with hydrogen and a dual function catalyst at hydroalkylation conditions including a temperature within the range of about 200° to 450°F. and at a hydrogen pressure of at least one atmosphere. The dual function catalyst comprises rhenium and an acidic oxide support. The acidic oxide support may be a silica-alumina cracking catalyst or a substantially alkali metal-free mixture of about 5 to 60 percent by weight of a crystalline zeolite and about 95 to 40 percent by weight of an alumina or a silica-alumina cracking catalyst. The hydrogenation activity of the rhenium may be modified by the inclusion of a Group VIII metal, a Group VI metal or their mixtures. Before use the composite catalyst is calcined at a temperature within the range of about 800° to 1500°F. and is reduced with hydrogen at a temperature within the range of about 400° to 1200°F. The process is useful in the hydroalkylation of benzene to prepare cyclohexylbenzene.

16 Claims, No Drawings

HYDROALKYLATION CATALYST AND PROCESS

BACKGROUND OF THE INVENTION

Cycloalkylbenzenes may be produced by the hydroalkylation of benzene and alkylbenzene hydrocarbons. For example, benzene may be reacted with hydrogen in the presence of a hydroalkylation catalyst to produce cyclohexylbenzene. By-products of this reaction may include cyclohexane, methylcyclopentane, dicyclohexylbenzenes and polycyclohexylbenzenes. Similarly, toluene may be hydroalkylated to produce methylcyclohexyltoluenes. Other alkylbenzenes may be hydroalkylated to produce the corresponding alkylcyclohexylalkylbenzenes. Mixtures of dissimilar aromatic hydrocarbons may be hydroalkylated in which case the more readily hydrogenated species tends to alkylate the less readily hydrogenated compound. For example, hydroalkylation of a benzene-toluene mixture may produce a product predominating in cyclohexyltoluene since benzene may be hydrogenated more readily than toluene. Products of the hydroalkylation process such as cyclohexylbenzene are valuable as solvents and as chemical intermediates. For example, cyclohexylbenzene is of commercial importance as a solvent and plasticizer in the plastics coatings and adhesives fields and as an intermediate in the manufacture of cyclohexanone and phenol by air oxidation and acid decomposition.

It is an object of the present invention to provide an improved catalyst and process for the hydroalkylation of benzene and alkylbenzene hydrocarbons. It is a further objective to provide a highly active hydroalkylation catalyst having resistance to sulfur poisoning and achieving high selectivity in conversion of benzene and alkylbenzenes to the corresponding cyclohexylbenzenes and cyclohexylalkylbenzenes. It is a further objective to provide a stable hydroalkylation catalyst capable of maintaining a high activity and selectivity in sustained use on a continuous basis.

SUMMARY OF THE INVENTION

It is postulated that the hydroalkylation of benzene to cyclohexylbenzene, as an example of the hydroalkylation process, proceeds by hydrogenation of a part of the benzene to a cyclohexene intermediate which intermediate then alkylates remaining benzene to produce the cyclohexylbenzene product. Thus the dual catalytic functions of hydrogenation and alkylation are required. However, a careful balance of these two functions is necessary such that the hydrogenation and alkylation reactions may proceed at complimentary rates. Hydrogenation activity is imparted by the use of rhenium while alkylation requires an acidic type catalyst. Excessive hydrogenation activity results in the production of unwanted cyclohexane whereas excessive acid activity may result in isomerization of the intermediates so that the final reaction product comprises a variety of products besides cyclohexylbenzene. In accordance with the process of this invention a hydroalkylation catalyst of high activity, selectivity, and stability is prepared by calcining and reducing a catalyst comprising rhenium and an acidic oxide support selected from the group of silica alumina cracking catalyst, and substantially alkali metal-free mixtures of about 5 to 60 percent by weight of a crystalline zeolite and about 95 to 40 percent by weight of a silica alumina cracking catalyst. The foregoing composition is calcined at a temperature within the range of about 800° to 1500°F. preferably within the range of about 1000° to 1200°F. and is reduced at a temperature within the range of about 500° to 1000°F. to prepare the hydroalkylation catalyst of our improved process. Hydroalkylation is effected by contacting an aromatic hydrocarbon charge selected from the group consisting of benzene, alkylbenzenes, and their mixtures with the foregoing catalyst at hydroalkylation conditions including a reaction temperature within the range of about 200° to 450°F. and preferably within the range of about 300° to 400°F. and at a hydrogen partial pressure in excess of one atmosphere and preferably within the range of about 100 to 500 pounds per square inch gauge.

DESCRIPTION OF THE PREFERRED EMBODIMENTS

The improved process of the present invention is carried out in the presence of a novel hydroalkylation catalyst. The catalyst comprises a hydrogenating component and an alkylating component. The hydrogenating component comprises rhenium or a compound of rhenium. The alkylating component of the catalyst comprises an acidic oxide support consisting essentially of silica alumina cracking catalyst or a substantially alkali metal-free mixture of about 5 to 60 percent by weight of a crystalline zeolite and about 95 to 40 percent by weight of an alumina or a silica-alumina cracking catalyst. The rhenium hydrogenating component may be modified by the inclusion of a Group VIII metal, a Group VI metal or their mixtures. Tungsten is a preferred modifying agent.

The silica-alumina cracking catalyst constituent of our composite catalyst may be any of the well known and commercially available silica-alumina cracking catalysts including both synthetic catalysts and those prepared by the processing of clays. Such catalysts are described for example in U. S. Pat. Nos. 2,363,231, 2,469,314, 2,469,314 and 2,935,463.

The crystalline zeolite which may be used in the acidic oxide support of our catalyst is advantageously prepared from Zeolite Y, described in U. S. Pat. No. 3,130,007, because catalysts prepared therefrom have high steam and thermal stability. The crystalline zeolite is modified to the extent that a considerable portion of the alkali metal is substituted by a hydrogen ion or an ion which is convertible to hydrogen, for example, ammonium. Sodium, present in the zeolite as originally produced is replaced by the positive hydrogen or ammonium ion by means of ion exchange. Suitably, this is done by contacting the zeolite with an aqueous solution of an organic or inorganic acid or an ammonium compound. Suitable acids include hydrochloric acid, sulfuric acid, nitric acid, sulfurous acid, acetic acid, oxalic acid, propionic acid, benzoic acid and the like. Ammonium ion may be supplied from nitrogen-containing compounds such as ammonium chloride, ammonium sulfate, ammonium sulfide, methylamines and the like.

For the removal of more than about 70 percent of the metal, for example, sodium ion from the zeolite, it is desirable to employ ammonium ion exchange rather than acid treatment since zeolites tend to decompose in a medium having a pH below about 2.5 to 4. The ammonium exchanged zeolite is calcined to drive off ammonia and obtain the zeolite in the hydrogen form. The crystalline zeolite is composited with a silica-alumina cracking catalyst in an amount of about 5 to 60 percent by weight of the composite. The silica-alumina cracking catalyst may comrpise about 5 to 30 percent by weight alumina and the balance silica.

Ordinarily the rhenium is added to the alumina, silica-alumina or composite of crystalline zeolite and silica-alumina comprising the acidic oxide support. Preferably this is done by contacting the support with a solution of a rhenium compound. The rhenium may be deposited by draining any excess solution from the support and drying. Ordinarily the catalyst is then calcined in an oxidizing atmosphere. By this procedure the rhenium will be in the form of the oxide deposited on the acidic oxide support. Rhenium for the preparation of catalytic compositions is usually employed as perrhenic and, $HReO_4$ or as ammonium perrhenate $NH_4ReO_4$. Aqueous solutions of ammonium perrhenate are advantageously employed. High concentrations of rhenium in aqueous solutions may be employed using tetralkylammonium salts, for example, tetramethylammonium perrhenate and other quartenaryammonium salts such as benzyltrimethylammonium perrhenate. Rhenium is incorporated into the catalyst in an amount within the range of about 0.1 to 10 weight percent and preferably about 1 to 5 weight percent. When modified with a Group VIII or a Group VI metal, about 0.2 to 0.6 weight percent modifying metal is employed.

The silica-alumina base is prepared, for example, by acidifying an aqueous sodium silicate solution with aqueous sulfuric acid, washing the resulting hydrated silica free from alkali metal salts, suspending the hydrated silica in an aluminum sulfate solution, precipitating alumina with ammonia, filtering and washing. The silica-alumina filter cake is then impregnated with the rhenium hydrogenating component or it may be composited with a crystalline zeolite and then impregnated.

In an example of the preparation of the acidic oxide support, a commercial Zeolite Y purchased from the Linde Division of Union Carbide Corporation is base exchanged to remove alkali metal and then incorporated in the foregoing silica-alumina cracking catalyst base. The sodium Zeolite Y is slurried in an aqueous solution of ammonium sulfate stirred for two hours at 200°F. and then filtered. This ion exchange procedure is repeated twice with fresh ammonium sulfate solutions and the resulting zeolite washed free of sulfate ion and then dried at 300°F. The partially decationized zeolite is calcined at 1,000°F. for three hours, and then further ion exchanged with a solution of ammonium sulfate for two hours at 200°F. and then filtered. This procedure is repeated once and the filter cake washed free of sulfate, dried and then calcined at 1,500°F. for three hours. The product analysis is 0.23% $Na_2O$, 16.5% $Al_2O_3$, 63.7% $SiO_2$ and it has a surface area of 608 m²/g.

The calcined decationized zeolite is thoroughly mixed with the silica-alumina cracking catalyst filtercake, filtered, dried overnight at 300°F. and then calcined at 1,000°F. with a loss of ignition of 11.2 percent to produce an acidic oxide catalyst support containing 22 weight percent crystalline zeolite and 78 weight percent silica-alumina cracking catalyst base.

The composite of zeolite and silica-alumina catalyst is then impregnated with 2 weight percent rhenium by the addition of an aqueous solution of ammonium perrhenate. The resulting catalyst is evaluated for hydroalkylation of benzene at the conditions and with the results shown in Table I.

TABLE I

| | |
|---|---|
| Temperature, °F. | 350 |
| Pressure p.s.i.g. | 445 |
| Benzene Feed rate, hr. | 2.6 moles/hour |
| Hydrogen Feed rate mols/hr | 1.07 |
| Liquid Hourly Space Valocity (LHSV) | 2 |
| Product Analysis, Wt. % | |
| Benzene | 76.5 |
| Methylcyclopentane (MCP) | 0.5 |
| Cyclohexane (CH) | 12.8 |
| Cyclohexylbenzenes (CHB) | 9.4 |
| Dicyclohexylbenzenes (DCHB) | 0.5 |
| Unidentified | 0.3 |

We claim:

1. A method for the catalytic hydroalkylation of an aromatic hydrocarbon charge selected from the group consisting of benzene, alkylbenzenes and their mixtures which comprises contacting said aromatic hydrocarbon charge and hydrogen at hydroalkylation conditions with a calcined and reduced catalyst comprising within the range of about 0.1 to 10.0 weight percent rhenium and an acidic oxide support.

2. The method of claim 1 wherein said acidic oxide support comprises a silica-alumina cracking catalyst.

3. The method of claim 1 wherein said acidic oxide support consists essentially of a substantially alkali metal-free mixture of about 5 to 60 percent by weight of a crystalline zeolite and about 95 to 40 percent by weight of a silica-alumina cracking catalyst.

4. The method of claim 1 wherein said acidic oxide support consists essentially of a substantially alkali metal-free mixture of about 5 to 60 percent by weight of a crystalline zeolite and about 95 to 40 percent by weight of alumina.

5. The method of claim 1 wherein said hydroalkylation conditions include a reaction temperature within the range of about 200° to 450°F. and a hydrogen partial pressure of at least one atmosphere.

6. The method of claim 1 wherein said hydroalkylation conditions include a reaction temperature within the range of about 300° to 400°F. and a hydrogen partial pressure within the range of about 100 to 500 pounds per square inch gauge.

7. The method of claim 1 wherein said catalyst consists essentially of tungsten, rhenium metal and said acidic oxide support.

8. The method of claim 1 wherein said crystalline zeolite is prepared by an alternative sequence of at least two ion exchanges and two calcinations.

9. The method of claim 1 wherein said catalyst is calcined at a temperature within the range of about 800° to 1500°F.

10. The method of claim 1 wherein said catalyst is calcined at a temperature within the range of about 1000° to 1200°F.

11. The method of claim 1 wherein said catalyst is reduced at a temperature within the range of about 400° to 1200°F.

12. The method of claim 1 wherein said catalyst is reduced at a temperature within the range of about 500° to 1000°F.

13. The method of claim 1 wherein said aromatic hydrocarbon charge is benzene.

14. A method for the catalytic hydroalkylation of an aromatic hydrocarbon charge selected from the group consisting of benzene, alkylbenzenes and their mixtures which comprises contacting said aromatic hydrocarbon charge and hydrogen at hydroalkylation conditions, including reaction temperature of 200°F.–450°F. and hydrogen partial pressure greater than one atmosphere and less than about 500 psig, with a calcined and reduced catalyst comprising within the range of about 0.1 to 10.0 weight percent rhenium and, as an acidic oxide support, a silica-alumina cracking catalyst.

15. A method for the catalytic hydroalkylation of benzene which comprises contacting said benzene charge and hydrogen at hydroalkylation conditions, including reaction temperature of 200°F.–450°F. and hydrogen partial pressure greater than one atmosphere and less than about 500 psig, with a calcined and reduced catalyst comprising within the range of about 0.1 to 10.0 weight percent rhenium and, as an acidic oxide support, a silica-alumina cracking catalyst, thereby forming a product stream containing cyclohexylbenzene; and recovering said product stream containing cyclohexylbenzene.

16. A method as claimed in claim 15 for the catalytic hydroalkylation of benzene which comprises contacting said benzene charge and hydrogen at hydroalkylation conditions, including reaction temperature of 200°F.–450°F. and hydrogen partial pressure greater than one atmosphere and less than about 500 psig, with a calcined and reduced catalyst comprising within the range of about 0.1 to 10.0 weight percent rhenium and, as an acidic oxide support, a composition consisting essentially of a substantially alkali metal-free mixture of about 5–60 percent by weight of a crystalline zeolite and about 40–95 percent by weight of a silica-alumina cracking catalyst.

* * * * *